(12) United States Patent
Takaoka

(10) Patent No.: US 10,817,226 B2
(45) Date of Patent: Oct. 27, 2020

(54) PROCESSING DATA GENERATION PROGRAM, AND PROCESSING DATA GENERATION SYSTEM

(71) Applicant: MIMAKI ENGINEERING CO., LTD., Nagano (JP)

(72) Inventor: Taiki Takaoka, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 16/548,815

(22) Filed: Aug. 22, 2019

(65) Prior Publication Data

US 2020/0073597 A1 Mar. 5, 2020

(30) Foreign Application Priority Data

Aug. 29, 2018 (JP) ................................ 2018-160454

(51) Int. Cl.
| | | |
|---|---|---|
| G06F 15/00 | (2006.01) | |
| G06K 1/00 | (2006.01) | |
| G06K 15/02 | (2006.01) | |
| G06F 3/12 | (2006.01) | |
| H04L 29/08 | (2006.01) | |

(52) U.S. Cl.
CPC .......... *G06F 3/1204* (2013.01); *G06F 3/1208* (2013.01); *G06F 3/1243* (2013.01); *H04L 67/10* (2013.01)

(58) Field of Classification Search
CPC .... G06F 3/1204; G06F 3/1208; G06F 3/1243; H04L 67/10

USPC .............................. 358/1.13, 1.2, 1.15, 1.14
See application file for complete search history.

(56) References Cited

U.S. PATENT DOCUMENTS

| | | | | |
|---|---|---|---|---|
| 2014/0023265 | A1* | 1/2014 | Kitazawa | G06T 7/001 382/151 |
| 2016/0125266 | A1* | 5/2016 | Fujiwara | G06T 7/001 382/215 |
| 2019/0082076 | A1* | 3/2019 | Sadowara | H04N 1/4097 |

FOREIGN PATENT DOCUMENTS

JP 2005128677 5/2005

* cited by examiner

*Primary Examiner* — Douglas Q Tran
(74) *Attorney, Agent, or Firm* — JCIPRNET

(57) ABSTRACT

A processing data generation program, a processing data generation system, and a processing data generation method are provided for enabling printed matters having various shapes and sizes. A processing data generation apparatus is configured to display a preview image of a template for print data (S121), contain templates for respective pieces of print data of multiple images having designs identical to each other and different sizes, receive designation of a template selected from a group of templates preview images of which are displayed at S121 (S122), identify cut data indicating a size of a cut area that matches the size of an image in the print data corresponding to the template the designation of which has been received at S122, and generate POP data including the cut data and print data created from the print data corresponding to the template the designation of which has been received at S122.

5 Claims, 13 Drawing Sheets

| Create | Create from template |
| --- | --- |
| | Re-create |
| Image input | |
| Edit | Character |
| | Graphic |
| | Register mark |
| | Masking |
| Output | |
| Import | |

FIG. 3

| Create | Newly create |
| --- | --- |
| | Create from template |
| | Re-create |

| Image input | |
| --- | --- |

| Edit | Character | |
| --- | --- | --- |
| | Graphic | |
| | Register mark | |
| | Masking | |
| | Extended | Pen |
| | | Pencil |
| | | Trace |
| | | Outline extraction |
| | | Residue removal cutting line |
| | | Data conversion |
| | | Graphic conversion |

| Output |
| --- |
| Import |

FIG. 5

PROCESSING DATA GENERATION PROGRAM, AND PROCESSING DATA GENERATION SYSTEM

CROSS REFERENCE TO RELATED APPLICATIONS

This application claims the priority benefit of Japanese Patent Application No. 2018-160454, filed on Aug. 29, 2018. The entirety of the above-mentioned patent application is hereby incorporated by reference herein and made a part of this specification.

TECHNICAL FIELD

The present disclosure relates to a processing data generation program, a processing data generation system, and a processing data generation method for generating print data.

DESCRIPTION OF THE BACKGROUND ART

Conventionally, a technique has been known that enables a PDF file of a point-of-purchase (POP) advertisement (hereinafter simply called "POP") to be generated by accessing a site via the Internet and then, on the site, for example, selecting a paper size for the POP, selecting a product for which the POP is to be posted, selecting a layout of the POP, and inputting the selling price of the product (see Patent Literature 1, for example).

Patent Literature 1: Japanese Unexamined Patent Publication No. 2005-128677

SUMMARY

However, the technique described in Patent Literature 1 has the problem that only POPs the shapes and sizes of which are the same as those of already available sheets of paper can be created.

In view of this, the present disclosure provides a processing data generation program, a processing data generation system, and a processing data generation method that enable printed matters having various shapes and sizes to be easily generated.

A non-transitory computer readable medium stored with a processing data generation program according to the present disclosure is a processing data generation program for generating a processing data including a print data and a cut data. The processing data generation program causes a computer to implement: a preview image displaying device, configured to display a preview image of a template for the print data; a template designation receiving device, configured to receive designation of a template selected from a group of templates preview images of which are displayed by the preview image displaying device; and a processing data generation device, configured to generate the processing data from the template the designation of which has been received by the template designation receiving device. The group includes: the templates for respective pieces of the print data of a plurality of images having designs identical to each other and different sizes. The processing data generation device is configured to identify the cut data indicating a size of a cut area that matches the size of an image in the print data corresponding to the template the designation of which has been received by the template designation receiving device, and generate the processing data including the cut data and the print data created from the print data corresponding to the template the designation of which has been received by the template designation receiving device.

With this configuration, the computer configured to execute the processing data generation program according to the present disclosure generates the processing data including not only the print data but also the cut data, and thus can easily generate printed matters having various shapes and sizes. The computer configured to execute the processing data generation program according to the present disclosure identifies the cut data indicating a size of a cut area that matches the size of an image in the print data corresponding to the designated template, and generates the processing data including the cut data and print data created from the print data corresponding to the designated template. This eliminates the need for a user to match the size of the image in the print data and the size of the cut area in the cut data with each other, whereby the printed matters can be easily generated.

In the non-transitory computer readable medium stored with the processing data generation program according to the present disclosure, the template may include: the cut data indicating a size of a cut area that matches the size of an image in the print data corresponding to the template, and the processing data generation device may be configured to identify, as the cut data indicating a size of a cut area that matches the size of an image in the print data corresponding to the template the designation of which has been received by the template designation receiving device, the cut data included in the template.

With this configuration, the computer configured to execute the processing data generation program according to the present disclosure generates new processing data from the template including the cut data indicating a size of a cut area that matches the size of an image in the corresponding print data. This eliminates the need for the user to designate the template for the print data and the cut data separately, whereby the printed matters can be easily generated.

In the non-transitory computer readable medium stored with the processing data generation program according to the present disclosure, the preview image displaying device may be configured to display, for the templates for the respective pieces of the print data of the images having designs identical to each other and different sizes, only one preview image that is common to all of these templates.

With this configuration, the computer configured to execute the processing data generation program according to the present disclosure displays, for the templates for the respective pieces of print data of the images having designs identical to each other and different sizes, only one preview image that is common to all of these templates. Thus, in comparison with a configuration in which preview images are displayed, by template, for the templates for the respective pieces of print data of the images having designs identical to each other and different sizes, the template on a screen can be more easily designated. Consequently, the printed matters can be easily generated.

A processing data generation system according to the present disclosure is a processing data generation system for generating a processing data including a print data and a cut data. The processing data generation system includes: a preview image displaying device, configured to display a preview image of a template for the print data; a template designation receiving device, configured to receive designation of a template selected from a group of templates preview images of which are displayed by the preview image displaying device; and a processing data generation device, configured to generate the processing data from the template the designation of which has been received by the template designation receiving device. The group includes: the templates for respective pieces of the print data of a plurality of images having designs identical to each other and different sizes. The processing data generation device is configured to identify the cut data indicating a size of a cut area that matches the size of an image in the print data corresponding to the template the designation of which has been received by the template designation receiving device, and generate the processing data including the cut data and the print data created from the print data corresponding to the template the designation of which has been received by the template designation receiving device.

With this configuration, the processing data generation system according to the present disclosure generates the processing data including not only the print data but also the cut data, and thus can easily generate printed matters having various shapes and sizes. The processing data generation system according to the present disclosure also identifies the cut data indicating a size of a cut area that matches the size of an image in the print data corresponding to the designated template, and generates the processing data including the cut data and print data created from the print data corresponding to the designated template. This eliminates the need for a user to match the size of the image in the print data and the size of the cut area in the cut data with each other, whereby the printed matters can be easily generated.

A processing data generation system according to the present disclosure is a processing data generation system for ejecting an ink from an ink ejection head to print a printed image on a recording medium and cutting the recording medium with a cutting head. The processing data generation system includes: a preview image displaying device, configured to display a plurality of preview images of templates for a print data of the printed image; a template designation receiving device, configured to receive designation of a template selected from among the preview images displayed by the preview image displaying device; and a cut data identifying device, configured to identify a cut data indicating a size of a cut area that matches the size of an image in the print data corresponding to the template the designation of which has been received by the template designation receiving device.

With this configuration, the processing data generation system according to the present disclosure identifies not only the print data but also the cut data, and thus can easily generate printed matters having various shapes and sizes. The processing data generation system according to the present disclosure also identifies the cut data indicating a size of a cut area that matches the size of an image in the print data corresponding to the designated template. This eliminates the need for a user to match the size of the image in the print data and the size of the cut area in the cut data with each other, whereby the printed matters can be easily generated.

A processing data generation method according to the present disclosure is a processing data generation method for generating a processing data including a print data and a cut data. The processing data generation method includes: a preview image displaying step of displaying a preview image of a template for the print data; a template designation receiving step of receiving designation of a template selected from a group of templates preview images of which are displayed at the preview image displaying step; and a processing data generation step of generating the processing data from the template the designation of which has been received at the template designation receiving step. The group includes: the templates for respective pieces of the print data of a plurality of images having designs identical to each other and different sizes. The processing data generation step is a step of identifying cut data indicating a size of a cut area that matches the size of an image in the print data corresponding to the template the designation of which has been received at the template designation receiving step, and generating processing data including the cut data and the print data created from the print data corresponding to the template the designation of which has been received at the template designation receiving step.

With this configuration, in the processing data generation method according to the present disclosure, the processing data including not only the print data but also the cut data is generated, and thus printed matters having various shapes and sizes can be easily generated. Furthermore, in the processing data generation method according to the present disclosure, the cut data indicating a size of a cut area that matches the size of an image in the print data corresponding to the designated template is identified, and the processing data including the cut data and print data created from the print data corresponding to the designated template is generated. This eliminates the need for a user to match the size of the image in the print data and the size of the cut area in the cut data with each other, whereby the printed matters can be easily generated.

The processing data generation program, the processing data generation system, and the processing data generation method according to the present disclosure enable printed matters having various shapes and sizes to be easily generated.

BRIEF DESCRIPTION OF THE DRAWINGS

FIG. 3 is a diagram illustrating a list of functions of a processing data generation program illustrated in FIG. 2 in its standard mode.

FIG. 5 is a diagram illustrating a list of functions of the processing data generation program illustrated in FIG. 2 in its advanced mode.

DESCRIPTION OF EMBODIMENTS

One embodiment of the present disclosure will now be described with reference to the drawings.

A configuration of a POP generation system as a printed matter generation system (processing data generation system) according to the present embodiment will be described first.

Figure 1:
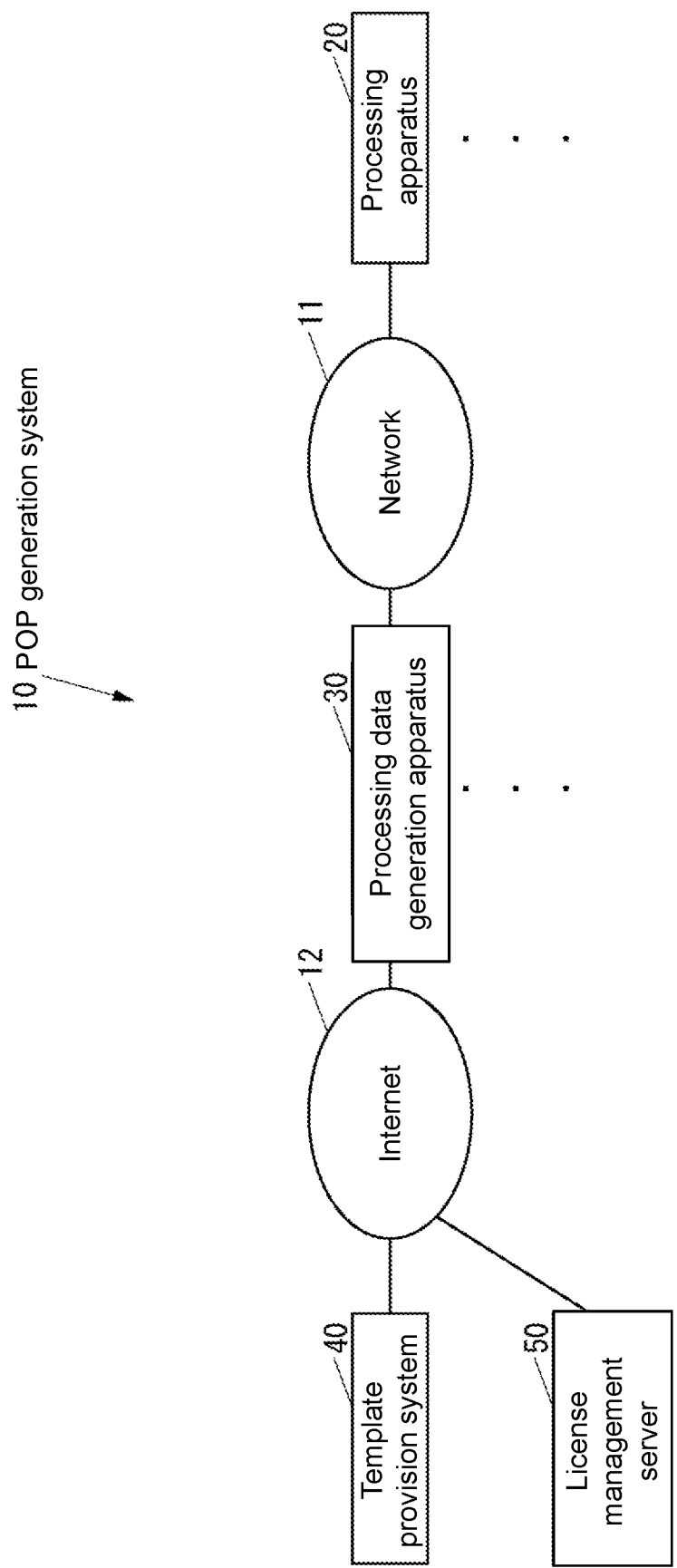
FIG. 1 is a block diagram of a POP generation system according to one embodiment of the present disclosure.

FIG. 1 is a block diagram of this POP generation system 10 according to the present embodiment.

As depicted in FIG. 1, the POP generation system 10 includes a processing apparatus 20 configured to print and cut a POP as a printed matter. The processing apparatus 20 is an apparatus having both a function of a printing device such as inkjet printer configured to eject ink from an ink ejection head to print a printed image on a recording medium and a function of a cutting device such as a cutting plotter configured to cut a recording medium with a cutting head. In other words, the processing apparatus 20 serves as the printing device and also the cutting device. The POP generation system 10 may include, in addition to the processing apparatus 20, at least one processing apparatus having a configuration similar to that of the processing apparatus 20.

The POP generation system 10 includes a processing data generation apparatus 30 configured to generate POP data as processing data for causing the processing apparatus included in the POP generation system 10 to print and cut a POP. The POP generation system 10 may include, in addition to the processing data generation apparatus 30, at least one processing data generation apparatus having a configuration similar to that of the processing data generation apparatus 30.

The POP data is data including print data for causing the processing apparatus to print a POP and cut data for causing the processing apparatus to cut the POP.

Figure 2:
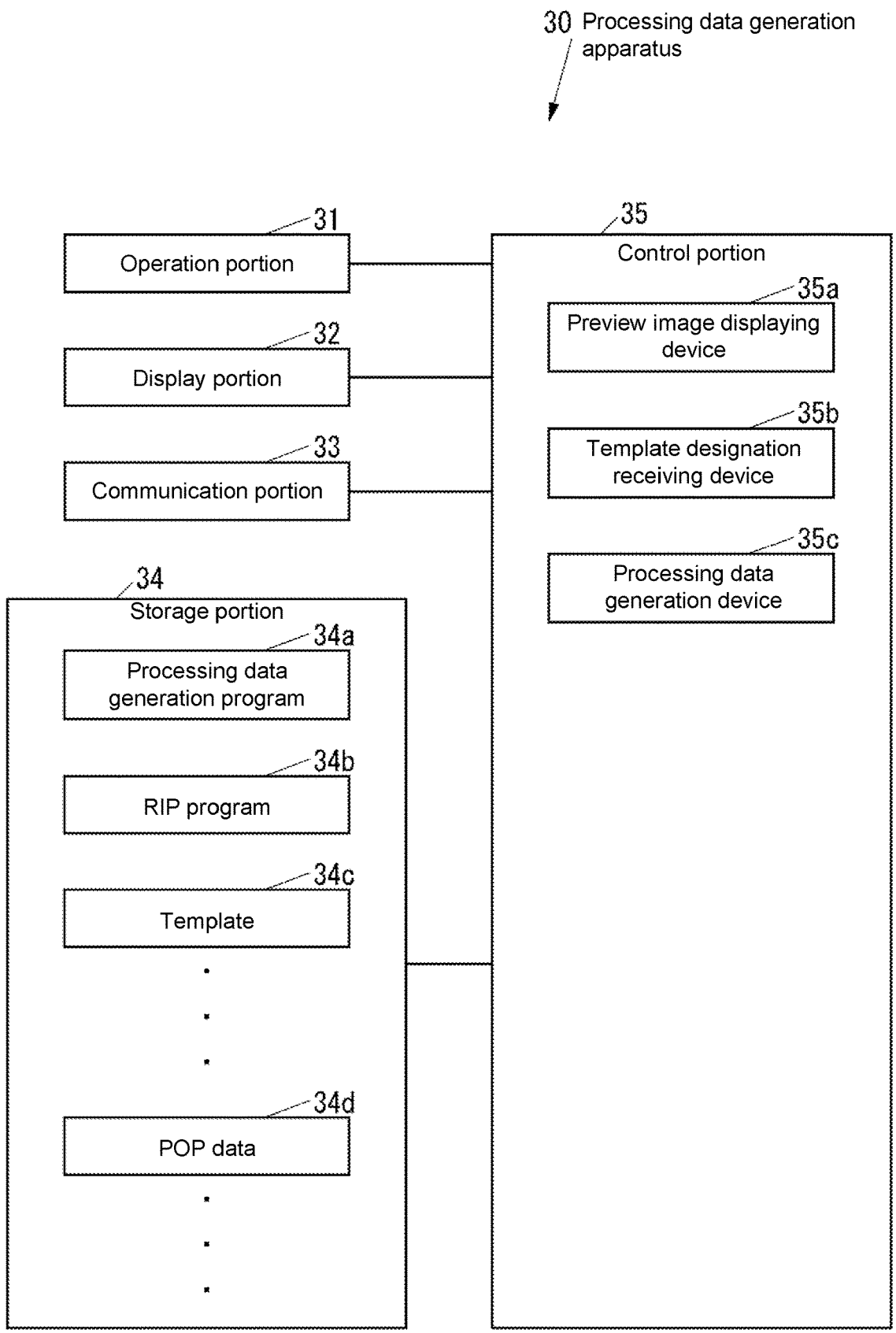
FIG. 2 is a block diagram of a processing data generation apparatus illustrated in FIG. 1.

FIG. 2 is a block diagram of the processing data generation apparatus 30.

As depicted in FIG. 2, the processing data generation apparatus 30 includes: an operation portion 31 that is an operation device such as a keyboard and a mouse through which various operations are input, a display portion 32 that is a display device such as liquid crystal display (LCD) configured to display various types of information, a communication portion 33 that is a communication device configured to communicate with an external device via a network such as a local area network (LAN) and the Internet or directly by wire or radio without the network, a storage portion 34 that is a nonvolatile storage device such as a semiconductor memory and a hard disk drive (HDD) configured to store various types of information, and a control portion 35 configured to control the entire processing data generation apparatus 30. The processing data generation apparatus 30 may be configured with, for example, a computer such as a personal computer (PC).

The storage portion 34 stores a processing data generation program 34a for generating POP data. The processing data generation program 34a includes a standard mode to be provided for a general user and an advanced mode to be provided for a particular user (hereinafter called "designer") who creates a template for POP data (hereinafter simply called "template").

The storage portion 34 stores a raster image processor (RIP) program 34b for causing the processing apparatus to print and cut a POP based on POP data.

The processing data generation program 34a and the RIP program 34b each may be installed in the processing data generation apparatus 30 when the processing data generation apparatus 30 is produced, for example, may be additionally installed in the processing data generation apparatus 30 from an external storage medium such as a compact disc (CD), a digital versatile disc (DVD), or a universal serial bus (USB) memory, or may be additionally installed in the processing data generation apparatus 30 via the network.

The storage portion 34 can store a template 34c. The storage portion 34 can store, in addition to the template 34c, at least one template having a configuration similar to that of the template 34c.

The storage portion 34 can store POP data 34d. The storage portion 34 can store, in addition to the POP data 34d, at least one piece of POP data having a configuration similar to that of the POP data 34d.

The control portion 35 includes a central processing unit (CPU), a read only memory (ROM) storing a program and various types of data, and a random access memory (RAM) as a memory used as a work area for the CPU of the control portion 35. The CPU of the control portion 35 executes the programs stored in the storage portion 34 or the ROM of the control portion 35.

The control portion 35 executes the processing data generation program 34a thereby implementing a preview image displaying device 35a of displaying a preview image of a template, a template designation receiving device 35b of receiving designation of a template selected from a group of templates preview images of which are displayed by the preview image displaying device 35a, and a processing data generation device 35c of generating POP data from the template the designation of which has been received by the template designation receiving device 35b.

As depicted in FIG. 1, the POP generation system 10 includes a template provision system 40 configured to provide a template. The template provision system 40 may be configured with one computer, or may be configured with a plurality of computers. The template provision system 40 may be a system configured to operate in a cloud. The template provision system 40 provides a website for providing a template (hereinafter called "template provision site"), and provides the template via the template provision site.

The POP generation system 10 includes a license management server 50 configured to authenticate the license of the processing data generation program.

The processing data generation apparatus 30 can communicate with the processing apparatus 20 via a network 11 such as the local area network (LAN). Herein, the processing data generation apparatus 30 may be capable of communicating with the processing apparatus 20 directly by wire or radio without the network 11. The at least one processing data generation apparatus included in the POP generation system 10 can communicate with any of processing apparatuses included in the POP generation system 10 in the same manner as with the processing data generation apparatus 30 via the network or by wire or radio without the network.

The processing data generation apparatus 30 can communicate with the template provision system 40 and the license management server 50 via the Internet 12. The processing data generation apparatus included in the POP generation system 10 can communicate with the template provision system 40 and the license management server 50 via the Internet 12 in the same manner as in the case of the processing data generation apparatus 30.

The following describes functions of the processing data generation program 34*a*.

FIG. 3 is a diagram illustrating a list of functions of the processing data generation program 34*a* in the standard mode.

As depicted in FIG. 3, the processing data generation program 34*a* can cause the processing data generation apparatus 30 to implement a "create" function of starting creation of POP data, an "image input" function of inserting an image such as JPEG image or BMP image into print data of the POP data, an "edit" function of editing the POP data, an "output" function of outputting the POP data to the RIP program 34*b*, and an "import" function of importing a template provided by the template provision system 40.

The "create" function includes a "create from template" function of starting creation of POP data on a basis of a template designated via the operation portion 31 among templates stored in the storage portion 34 and a "re-create" function of starting creation of a new piece of POP data on a basis of a piece of POP data designated via the operation portion 31 among pieces of POP data stored in the storage portion 34.

The "image input" function is a function not only capable of inserting an image such as an actual product image into print data of POP data, but also capable of changing the size of the image inserted into the print data and rotating and moving the image inserted into the print data.

The "edit" function includes: a "character" function capable of editing characters in print data of POP data; a "graphic" function capable of editing a graphic object in the print data of the POP data; a "register mark" function capable of adding, to the print data of the POP data, a register mark to be read by a cutting device in order to adjust the position of an area to be cut by the cutting device; and a "masking" function capable of masking an image inserted by the "image input" function with a certain graphic object.

The "character" function is a function not only capable of changing a character string into another character string, but also capable of changing fonts or colors of characters, and rotating and moving the characters.

The "graphic" function is a function not only capable of changing a graphic object into another graphic object, but also capable of changing sizes or colors of the graphic object and rotating and moving the graphic object. Examples of the graphic object that can be changed by the "graphic" function include a circle, polygons (triangles, quadrangles, stars, etc.), cloud shapes, and heart shapes.

Figure 4:
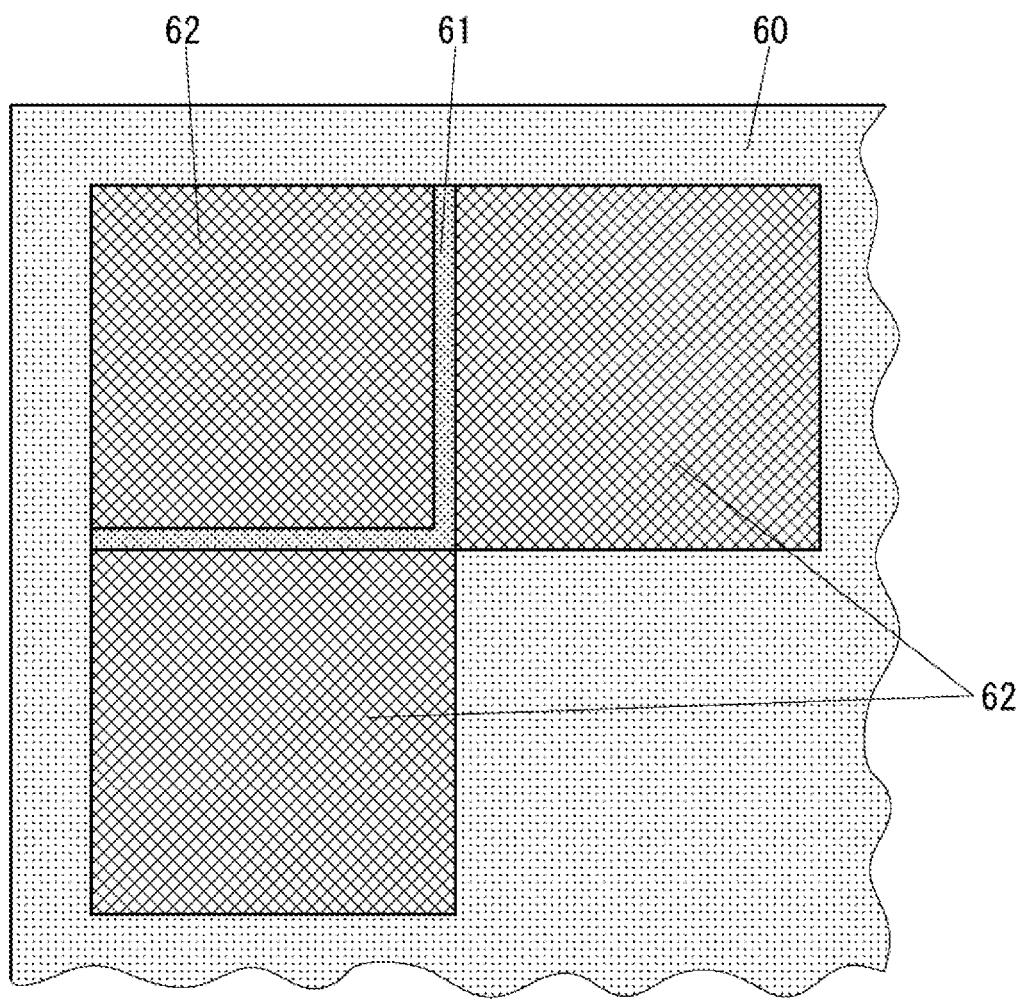
FIG. 4 is a diagram illustrating part of an image printed by a processing apparatus illustrated in FIG. 1.

The "register mark" function is not only capable of adding an outer register mark or an inner register mark, but also capable of filling around the register mark. The filling around the register mark is to add, to a register mark 61, filled areas 62 having a color that is not the same as nor similar to both the color of a recording medium 60 and the color of the register mark 61 as depicted in FIG. 4, for example. When an image based on POP data is printed on a recording medium of polyethylene terephthalate (PET), for example, by the printing device, this filling is performed in order for the register mark 61 to be appropriately recognized by the cutting device even if the color of the recording medium 60 and the color of the register mark 61 is the same as or similar to each other.

The "masking" function is a function capable of masking an image inserted by the "image input" function with a graphic object such as a circle, a polygon (a triangle, a quadrangle, a star, etc.), a cloud shape, or a heart shape designated via the operation portion 31.

The "output" function is a function capable of setting a printing method such as rotation or mirroring and the number of copies to be printed via the operation portion 31.

The "import" function is a function of downloading a template selected via the operation portion 31 from the template provision site provided by the template provision system 40 into the storage portion 34.

The functions described above are functions of the processing data generation program 34*a* in the standard mode. The processing data generation program 34*a* in the advanced mode can cause the processing data generation apparatus 30 to implement, in addition to the functions in the standard mode, functions described below.

FIG. 5 is a diagram illustrating a list of functions of the processing data generation program 34*a* in the advanced mode.

As depicted in FIG. 5, the processing data generation program 34*a* can cause the processing data generation apparatus to implement, as one function included in the "create" function, a "newly create" function of newly starting creation of POP data instead of starting creation of POP data on the basis of a template or POP data.

The processing data generation program 34*a* can cause the processing data generation apparatus to implement an "extended" function as one function of the "edit" function. The "extended" function includes a "pen" function of editing a line segment of a vector object, a "pencil" function of drawing a graphic object freehand, a "trace" function of extracting an outline of an image in image data such as JPEG data or BMP data with a color designated by a user, an "outline extraction" function of extracting an outline with a rectangle of vector data, a "residue removal cutting line" function of reducing the possibility that a character or a graphic object may be peeled by mistake, a "data conversion" function of converting vector data into print data or cut data, and a "graphic conversion" function of combining a quadrangle and a circle and converting the resulting object into a vector object.

Figure 6A:
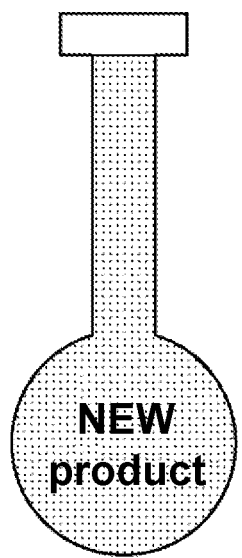
FIGS. 6A to 6C are diagrams illustrating examples of templates that can be created in the advanced mode of the processing data generation program illustrated in FIG. 2.
Figure 6B:
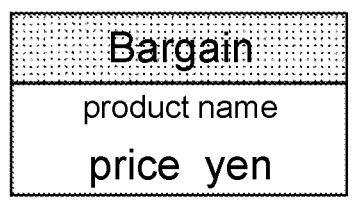
Figure 6C:

FIGS. 6A to 6C are diagrams illustrating examples of templates that can be created by the advanced mode of the processing data generation program.

With the advanced mode of the processing data generation program, the designer can create templates for various types of POPs such as a swing POP as depicted in FIG. 6A, for example, a price card as depicted in FIG. 6B, for example, and a ceiling-hung POP as described in FIG. 6C, for example. In the template illustrated in FIG. 6B, the character string "product name" is a character string that is expected to be changed to a character string indicating an actual product name. In the template illustrated in FIG. 6B, the character string "price" is a character string that is expected to be changed to a character string indicating an actual product price.

Templates created by the designer using the advanced mode of the processing data generation program are registered in the template provision system 40 by an administrator of the template provision system 40, for example.

The following describes operation of the POP generation system 10.

Operation of the POP generation system 10 when the processing data generation apparatus 30 downloads and imports a template from the template provision system 40 will be described first.

Figure 7:
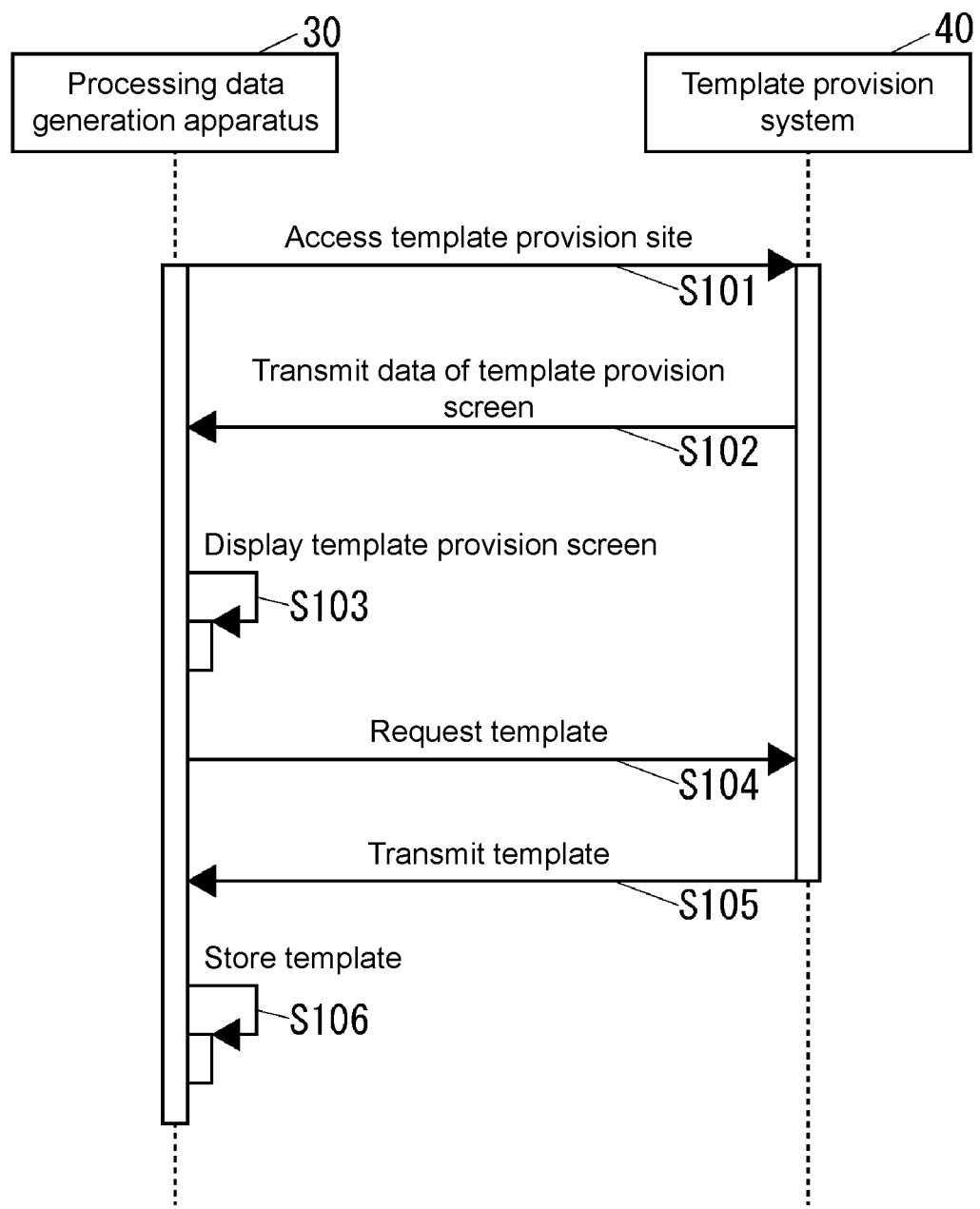
FIG. 7 is a sequence diagram of operation of the POP generation system illustrated in FIG. 1 when the processing data generation apparatus downloads and imports a template from a template provision system.

FIG. 7 is a sequence diagram of the operation of the POP generation system 10 when the processing data generation apparatus 30 downloads and imports a template from the template provision system 40.

When having been instructed via the operation portion 31 to execute the "import" function of the processing data generation program 34*a*, the preview image displaying device 35*a* of the processing data generation apparatus 30 accesses the template provision site provided by the template provision system 40 as depicted in FIG. 7 (S101).

When the template provision site has been accessed at S101, the template provision system 40 transmits data of a screen of the template provision site (hereinafter called "template provision screen") to the processing data generation apparatus 30 (S102).

When the data of the template provision screen has been sent at S102, the preview image displaying device 35*a* of the processing data generation apparatus 30 displays the template provision screen on the display portion 32 on the basis of the transmitted data (S103).

In the template provision screen, a template can be searched by categories such as Christmas and New Year. On the template provision site, only a template for an image in one size may be registered for the same image design, or templates for a plurality of images in the respective sizes may be registered for the same image design.

Figure 8:
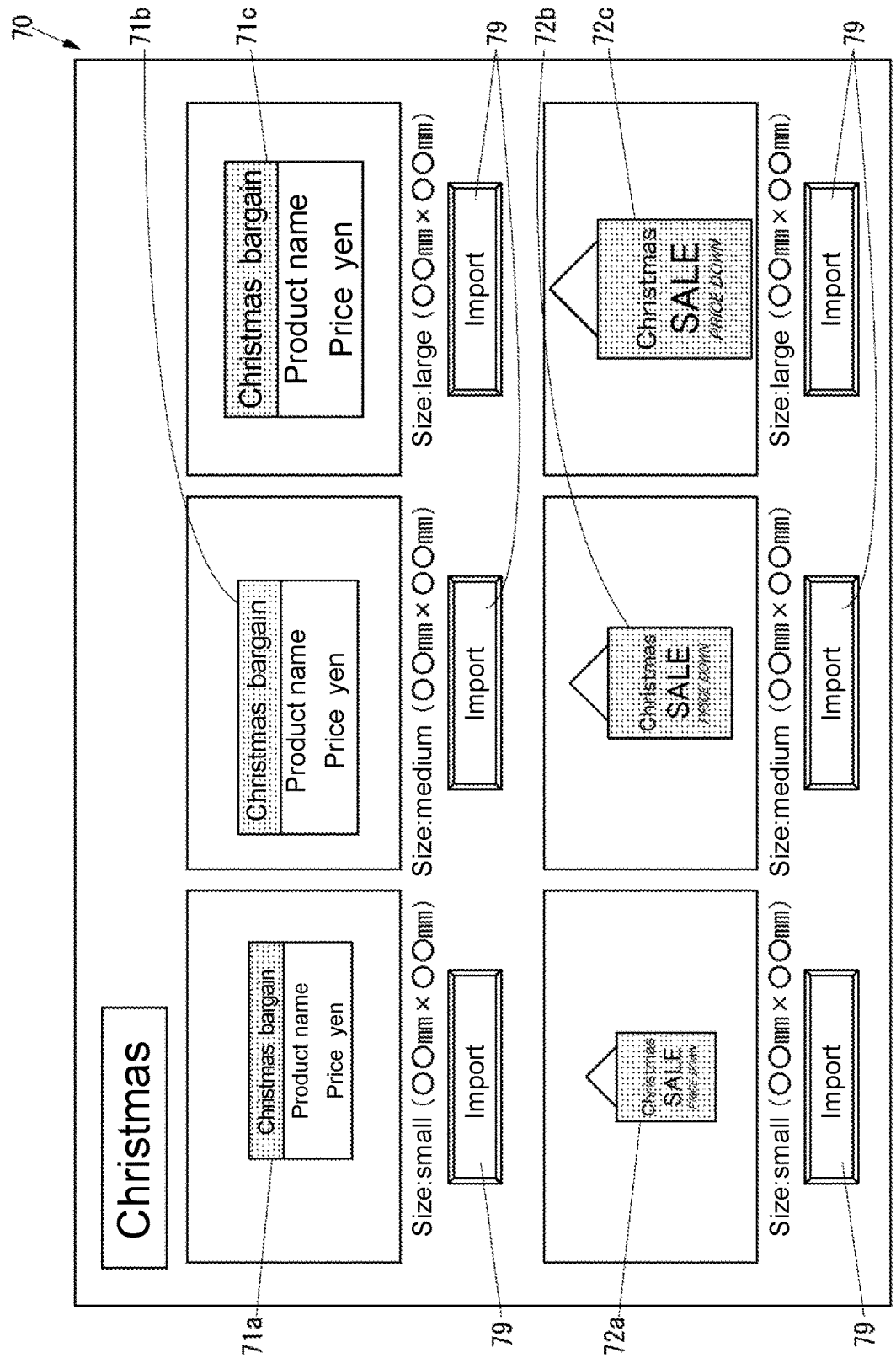
FIG. 8 is a diagram illustrating one example of a template provision screen displayed on a display portion of the processing data generation apparatus illustrated in FIG. 2.
Figure 9:
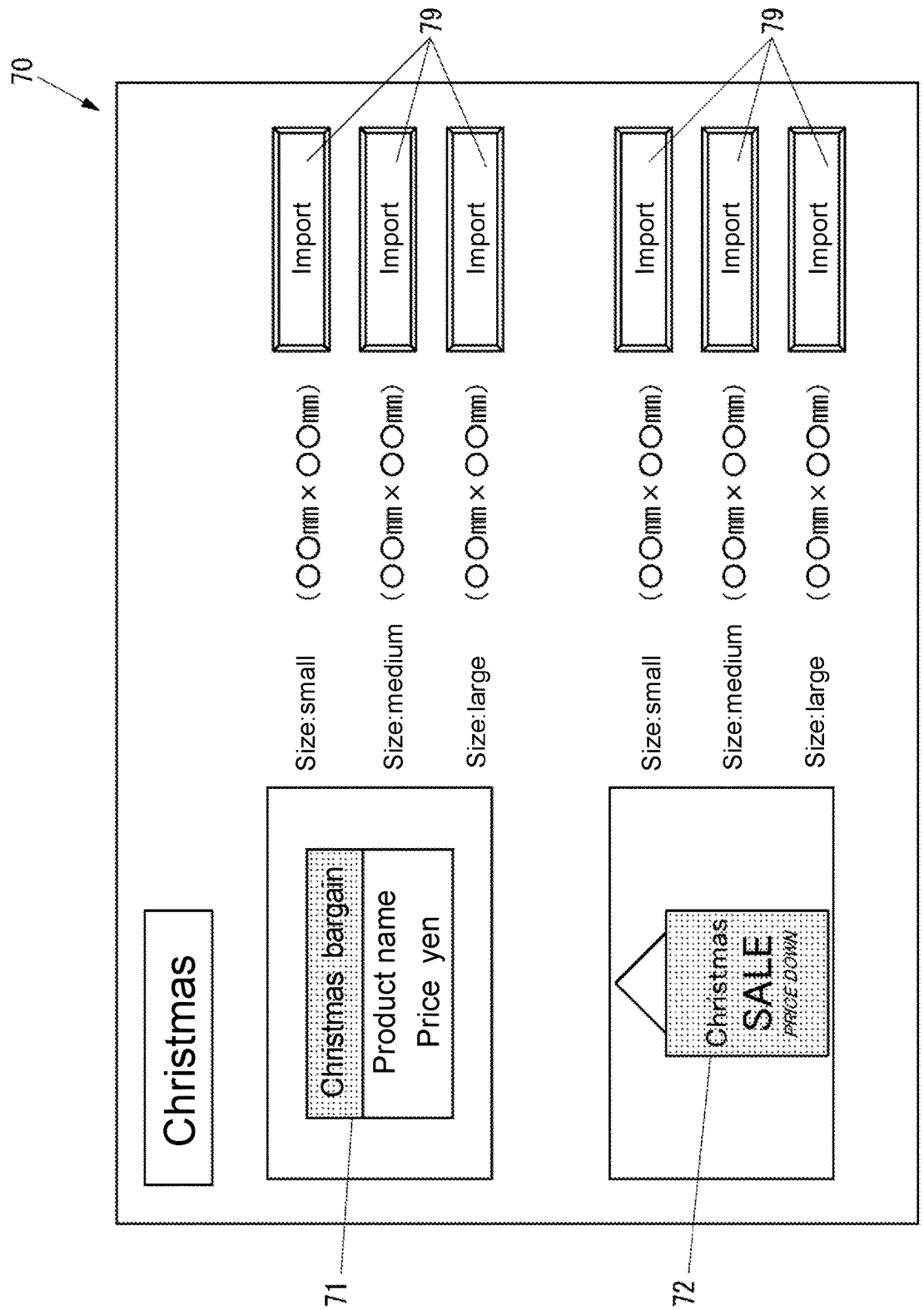
FIG. 9 is a diagram illustrating one example of the template provision screen displayed on the display portion of the processing data generation apparatus illustrated in FIG. 2 other than the example illustrated in FIG. 8.

FIG. 8 and FIG. 9 are diagrams each illustrating one example of a template provision screen 70 displayed on the display portion 32 of the processing data generation apparatus 30. Each template provision screen 70 illustrated in FIG. 8 and FIG. 9 is a screen displaying templates related to Christmas.

On the template provision screen 70 illustrated in FIG. 8, preview images 71*a* to 71*c* and 72*a* to 72*c* of the templates are displayed. The preview images 71*a* to 71*c* are preview images, prepared by template, of templates for respective pieces of POP data of print data of a plurality of images having designs identical to each other and different sizes. Similarly, the preview images 72*a* to 72*c* are preview images, prepared by template, of templates for the respective pieces of POP data of print data of a plurality of images having designs identical to each other and different sizes. In each of the templates displayed as the preview images 71*a* to 71*c*, the character string "product name" is a character string that is expected to be changed to a character string indicating an actual product name. In each of the templates displayed as the preview images 71*a* to 71*c*, the character string "price" is a character string that is expected to be changed to a character string of a number indicating an actual product price. Near the respective templates displayed on the template provision screen 70, import buttons 79 for importing the templates are arranged.

On the template provision screen 70 illustrated in FIG. 9, a preview image 71 and a preview image 72 of templates are displayed. The preview image 71 is a preview image that is common to all of templates for the respective pieces of POP data of print data of a plurality of images having designs identical to each other and different sizes. Similarly, the preview image 72 is a preview image that is common to all of templates for the respective pieces of POP data of print data of a plurality of images having designs identical to each other and different sizes.

The template provision site may provide either of the template provision screen 70 illustrated in FIG. 8 and the template provision screen 70 illustrated in FIG. 9. For example, the template provision site may provide one of the template provision screen 70 illustrated in FIG. 8 and the template provision screen 70 illustrated in FIG. 9, which is based on an instruction from the processing data generation apparatus 30.

As depicted in FIG. 7, after the process at S103, when an import button has been pressed on the template provision screen displayed at S103 via the operation portion 31, the template designation receiving device 35*b* of the processing data generation apparatus 30 requests a template corresponding to the pressed import button from the template provision site (S104).

When the template has been requested at S104, the template provision system 40 transmits the requested template to the processing data generation apparatus 30 (S105).

When having received the template transmitted at S105, the template designation receiving device 35*b* of the processing data generation apparatus 30 stores the transmitted template in the storage portion 34 (S106). In other words, the template designation receiving device 35*b* downloads and imports a template provided by the template provision system 40 from the template provision site.

The following describes operation of the processing data generation apparatus 30 when creation of POP data is started from a template.

Figure 10:
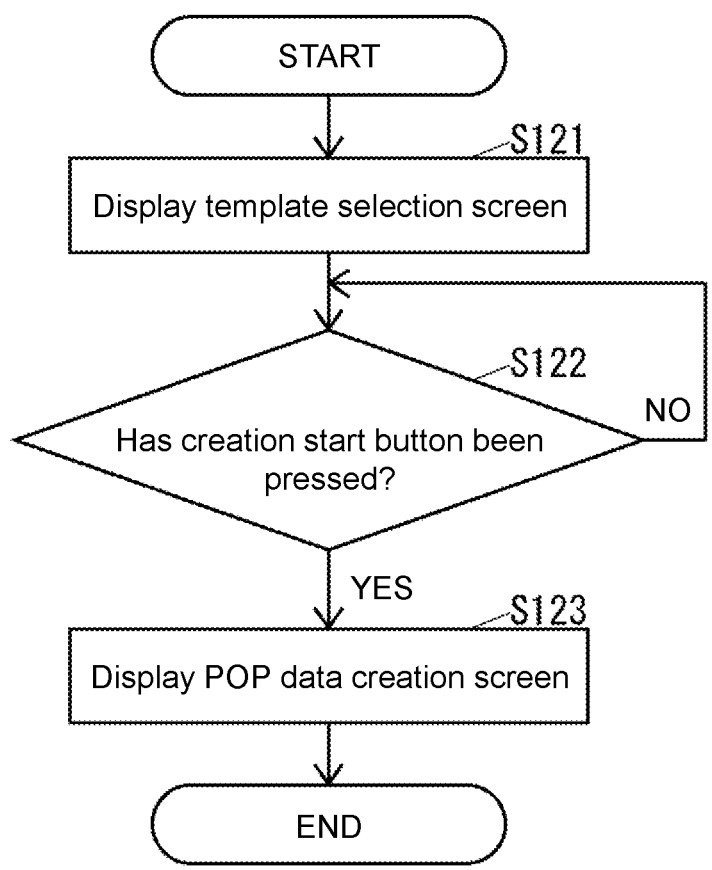
FIG. 10 is a flowchart of operation of the processing data generation apparatus illustrated in FIG. 2 when creation of POP data is started from a template.

FIG. 10 is a flowchart of the operation of the processing data generation apparatus 30 when creation of POP data is started from a template.

When having been instructed to execute the "create from template" function of the processing data generation program 34*a* via the operation portion 31, the preview image displaying device 35*a* of the processing data generation apparatus 30 performs operation illustrated in FIG. 10.

As depicted in FIG. 10, the preview image displaying device 35*a* displays, on the display portion 32, a screen for selecting a template (hereinafter called "template selection screen") stored in the storage portion 34 (S121).

On the template selection screen, a template can be searched by categories such as Christmas and New Year. In the storage portion 34, only a template for an image in one size may be stored for the same image design, or templates for a plurality of images in the respective sizes may be stored for the same image design.

Figure 11:
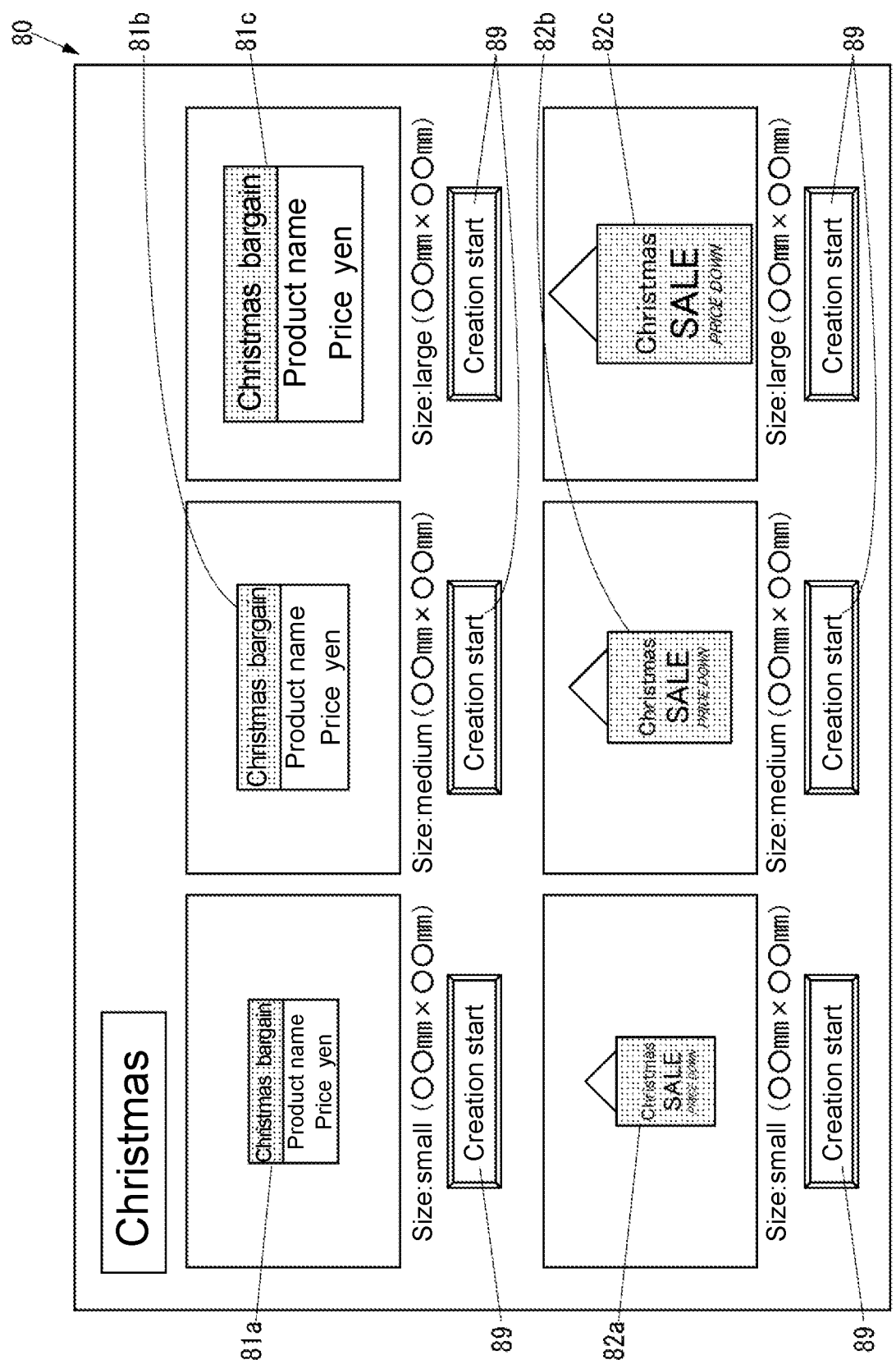
FIG. 11 is a diagram illustrating one example of a template selection screen displayed on the display portion of the processing data generation apparatus illustrated in FIG. 2.
Figure 12:
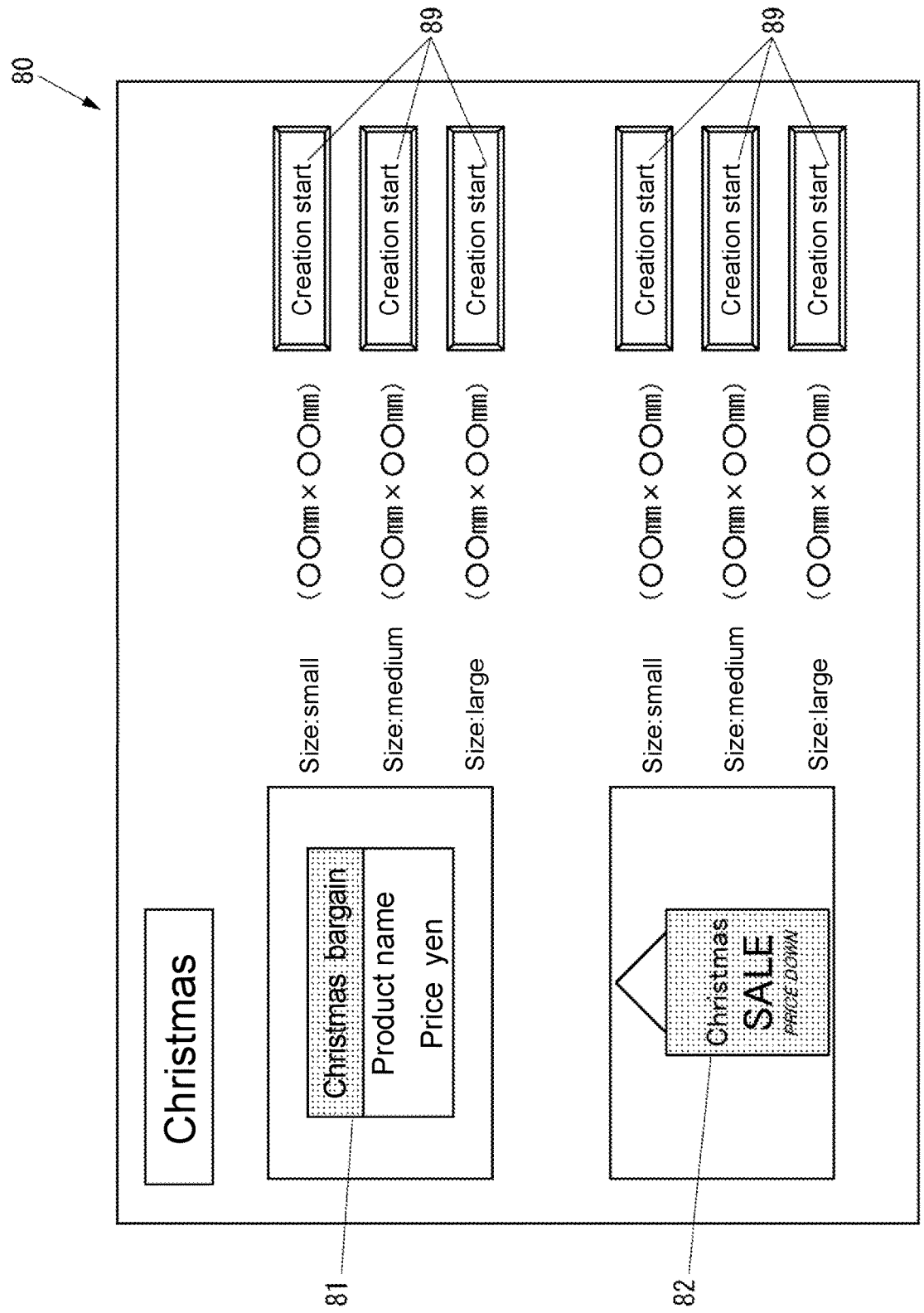
FIG. 12 is a diagram illustrating one example of the template selection screen displayed on the display portion of the processing data generation apparatus illustrated in FIG. 2 other than the example illustrated in FIG. 11.

FIG. 11 and FIG. 12 are diagrams each illustrating one example of a template selection screen 80 displayed on the display portion 32 of the processing data generation apparatus 30. Each template selection screen 80 illustrated in FIG. 11 and FIG. 12 is a screen displaying template related to Christmas.

On the template selection screen 80 illustrated in FIG. 11, preview images 81*a* to 81*c* and 82*a* to 82*c* of the templates are displayed. The preview images 81*a* to 81*c* are preview images that are the same as the preview images 71*a* to 71*c* (see FIG. 8), which are preview images, prepared by template, of templates for the respective pieces of POP data of print data of a plurality of images having designs identical to each other and different sizes. Similarly, the preview images 82*a* to 82*c* are preview images that are the same as the preview images 72*a* to 72*c* (see FIG. 8), which are preview images, prepared by template, of templates for POP data of print data of a plurality of images having designs identical to each other and different sizes. Near the respective templates displayed on the template selection screen 80, creation start buttons 89 for starting creation of POP data from the templates are arranged.

On the template selection screen 80 illustrated in FIG. 12, a preview image 82 and a preview image 81 of templates are displayed. The preview image 81 is a preview image that is the same as the preview image 71 (see FIG. 9), which is a preview image that is common to all of templates for the respective pieces of POP data of print data of a plurality of images having designs identical to each other and different sizes. Similarly, the preview image 82 is a preview image that is the same as the preview image 72 (see FIG. 9), which is a preview image that is common to all of templates for the respective pieces of POP data of print data of a plurality of images having designs identical to each other and different sizes.

The preview image displaying device 35*a* may display either of the template selection screen 80 illustrated in FIG. 11 and the template selection screen 80 illustrated in FIG. 12. For example, the preview image displaying device 35*a* may display one of the template selection screen 80 illustrated in FIG. 11 and the template selection screen 80 illustrated in FIG. 12, which is based on an instruction input via the operation portion 31.

As depicted in FIG. 10, after the process at S121, the template designation receiving device 35*b* determines whether a creation start button has been pressed until determining that a creation start button has been pressed on the template selection screen displayed at S121 via the operation portion 31 (S122).

When having determined that a creation start button has been pressed at S122, the processing data generation device 35*c* displays, on the display portion 32, a POP data creation screen (not depicted) for creating POP data from a template corresponding to the pressed creation start button (S123), and ends the operation illustrated in FIG. 10.

The following describes operation of the processing data generation apparatus 30 when creation of new POP data is started from POP data.

The operation of the processing data generation apparatus 30 when creation of new POP data is started from POP data is similar to the operation of the processing data generation apparatus 30 when creation of POP data is started from a template. When having been instructed to execute the "re-create" function of the processing data generation program 34*a* via the operation portion 31, the preview image displaying device 35*a* of the processing data generation apparatus 30 displays a screen for selecting POP data stored in the storage portion 34 (hereinafter called "POP data selection screen") on the display portion 32. The POP data selection screen herein is a screen that is the same as the template selection screen except that preview images of POP data are arranged on the screen instead of preview images of templates. The processing data generation device 35*c* of the processing data generation apparatus 30 displays, on the display portion 32, a POP data creation screen (not depicted) for creating new POP data from POP data corresponding to a creation start button that has been pressed on the POP data selection screen via the operation portion 31.

While displaying the POP data creation screen after starting creation of POP data from a template or POP data, the processing data generation device 35*c* can create the POP data by inserting an image into the POP data when having been instructed to execute the "image input" function of the processing data generation program 34*a* via the operation portion 31 or by editing the POP data when having been instructed to execute the "edit" function of the processing data generation program 34*a* via the operation portion 31. While displaying the POP data creation screen, when having been instructed to end the creation of the POP data via the operation portion 31, the processing data generation device 35*c* stores the finally created POP data in the storage portion 34.

The following describes operation of the processing data generation apparatus 30 when the processing apparatus 20 is caused to perform processing based on POP data.

Figure 13:
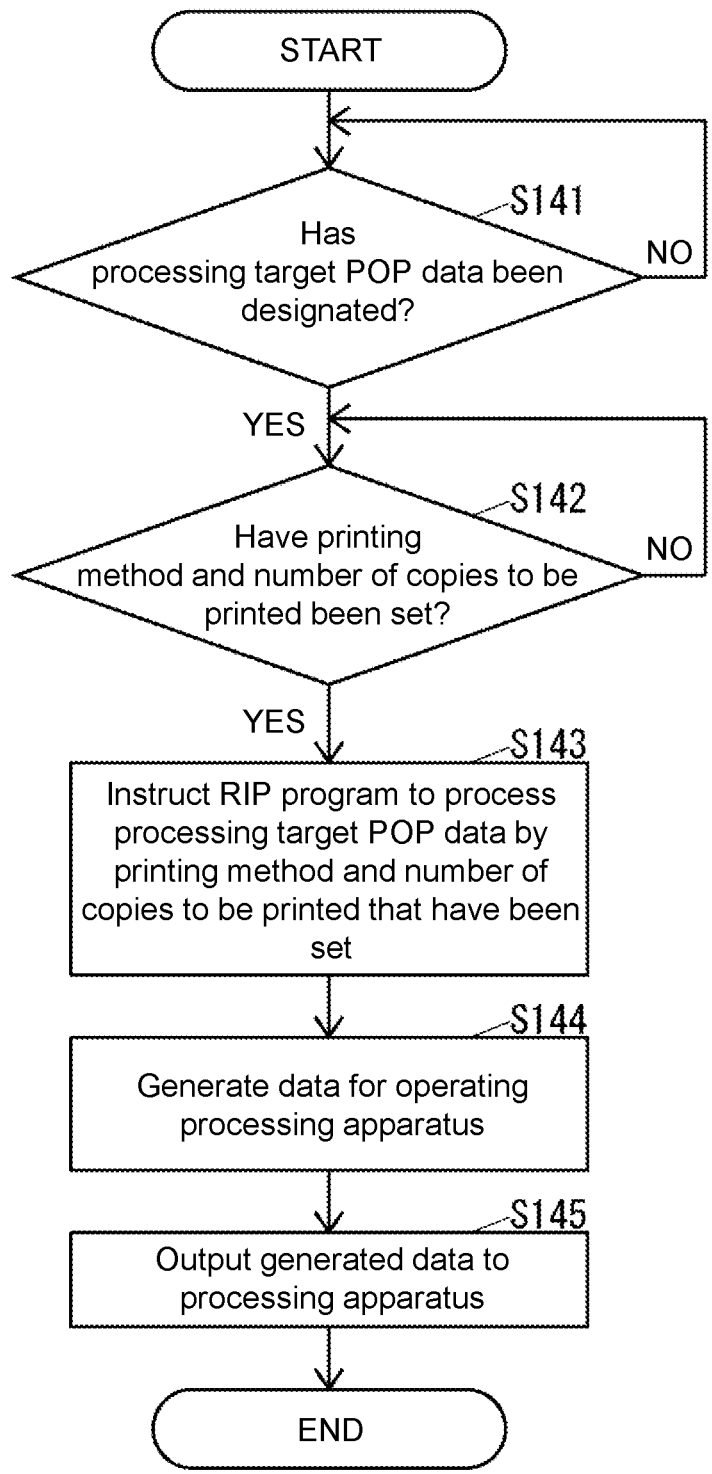
FIG. 13 is a flowchart of operation of the processing data generation apparatus illustrated in FIG. 2 when the processing apparatus is caused to perform processing based on POP data.

FIG. 13 is a flowchart of the operation of the processing data generation apparatus 30 when the processing apparatus 20 is caused to perform processing based on POP data.

When having been instructed to execute the "output" function of the processing data generation program 34*a* via the operation portion 31, the control portion 35 of the processing data generation apparatus 30 executes the operation illustrated in FIG. 13.

As depicted in FIG. 13, the control portion 35 determines whether POP data to be processed by the processing apparatus 20 (hereinafter called "processing target POP data") has been designated until determining that the processing target POP data has been designated (S141). Herein, the control portion 35 allows POP data stored in the storage portion 34 to be designated as the processing target POP data via the operation portion 31, and when the POP data creation screen is displayed on the display portion 32, allows certain POP data on the POP data creation screen to be designated as the processing target POP data via the operation portion 31.

When having determined that the processing target POP data has been designated at S141, the control portion 35 determines whether a printing method such as rotation or mirroring and the number of copies to be printed have been set until determining that the printing method and the number of copies to be printed have been set (S142). Herein, the control portion 35 can set the printing method and the number of copies to be printed via the operation portion 31.

When having determining that the printing method and the number of copies to be printed have been set at S142, the control portion 35 instructs the RIP program 34*b* to process the processing target POP data determined to be designated at S141 by the printing method and the number of copies to be printed that have been determined to be set at S142 (S143).

After the process at S143, the control portion 35 executes the RIP program 34*b* to generate data for causing the processing apparatus 20 to operate as instructed at S143 (S144). Herein, when a recording medium to be processed by the processing apparatus 20 is set to be transparent, the control portion 35 generates data in which a white layer is added as an undercoat for a layer to be printed based on the processing target POP data at S144.

After the process at S144, the control portion 35 outputs the data generated at S144 to the processing apparatus 20 (S145), and ends the operation illustrated in FIG. 13. Thus, the processing apparatus 20 performs printing and cutting as instructed at S143 to generate a POP.

As described above, the processing data generation apparatus 30 generates POP data as processing data including not only print data but also cut data, and thus can easily generate POPs having various shapes and sizes.

The processing data generation apparatus 30 identifies cut data indicating a size of a cut area that matches the size of an image in a print data corresponding to a designated template, and generates the POP data including this cut data and print data created from the print data corresponding to the designated template. This eliminates the need for a user to match the size of the image in the print data and the size of the cut area in the cut data with each other, whereby the POPs can be easily generated.

The processing data generation apparatus 30 identifies, as the cut data indicating the size that matches the size of an image in a print data corresponding to the designated template, cut data included in the template. In other words, the processing data generation apparatus 30 generates new POP data from the template including the cut data indicating a size of a cut area that matches the size of an image in the corresponding print data. Thus, the processing data generation apparatus 30 enables the user to easily generate the POPs without the need to designate the template for the print data and the cut data separately. For example, the processing data generation apparatus 30 enables a part-time worker of a supermarket to generate a POP in a short time such as 10 minutes.

The processing data generation apparatus 30 may be configured to designate the template for the print data and the cut data separately. When being configured to designate the template for the print data and the cut data separately, the processing data generation apparatus 30 may allow, to be specifiable by the user, only the cut data indicating a size of a cut area that matches the size of an image in the print data corresponding to the designated template.

The processing data generation apparatus 30 may display, for templates for respective pieces of POP data of print data of images having designs identical to each other and different sizes, only one preview image that is common to all of these templates (see FIG. 9 and FIG. 12). In this case, in comparison with a configuration in which preview images are displayed, by template, for the templates for the respective pieces of POP data of print data of the images having designs identical to each other and different sizes (see FIG. 8 and FIG. 11), a template on the template provision screen or the template selection screen can be more easily designated. Consequently, the POPs can be easily generated.

In the present embodiment, the POP generation system 10 includes the processing apparatus configured to perform printing and cutting. However, the POP generation system 10 may include a printing device such as an inkjet printer configured to perform printing and a cutting device such as a cutting plotter configured to perform cutting separately.

The processing data generation system according to the present disclosure may be configured with only the processing data generation apparatus 30, or may be configured with the processing data generation apparatus 30 and other electronic equipment. For example, the processing data generation system according to the present disclosure may include the processing data generation apparatus 30 and the template provision system 40.

In the present embodiment, the processing data includes both print data and cut data. However, the processing data may include only either one of the print data and the cut data.

When the POP generation system 10 includes the printing device and the cutting device separately, the processing data generation apparatus 30 may receive designation of template for print data, and the printing device may perform printing on a recording medium on the basis of print data based on the template and also transfer this print data to the cutting device. Subsequently, the cutting device may identify cut data indicating a size of a cut area that matches the size of an image in this print data, and based on the cut data identified by the cutting device, the cutting device may cut the recording medium on which the printing has been performed by the printing device.

The POP generation system 10 may be configured to contain, as defaults, a plurality of pieces of cut data indicating different sizes for printed images having the same design. Alternatively, the POP generation system 10 may be configured to contain, as defaults, cut data indicating one size only for printed images having the same design, and may scale up and down this cut data indicating one size when using it.

What is claimed is:

1. A non-transitory computer readable medium stored with a processing data generation program for generating a processing data including a print data and a cut data, the processing data generation program causing a computer to implement:
    a preview image displaying device, configured to display a preview image of a template for the print data;
    a template designation receiving device, configured to receive designation of a template selected from a group of templates preview images of which are displayed by the preview image displaying device; and
    a processing data generation device, configured to generate the processing data from the template the designation of which has been received by the template designation receiving device,
    wherein
    the group includes: the templates for respective pieces of the print data of a plurality of images having designs identical to each other and different sizes, and
    the processing data generation device is configured to:
        identify the cut data indicating a size of a cut area that matches the size of an image in the print data corresponding to the template the designation of which has been received by the template designation receiving device, and
        generate the processing data including the cut data and the print data created from the print data corresponding to the template the designation of which has been received by the template designation receiving device.

2. The non-transitory computer readable medium stored with the processing data generation program according to claim 1, wherein
    the template includes: the cut data indicating a size of a cut area that matches the size of an image in the print data corresponding to the template, and
    the processing data generation device is configured to identify, as the cut data indicating a size of a cut area that matches the size of an image in the print data corresponding to the template the designation of which has been received by the template designation receiving device, the cut data included in the template.

3. The non-transitory computer readable medium stored with the processing data generation program according to claim 1, wherein
    the preview image displaying device is configured to display, for the templates for the respective pieces of the print data of the images having designs identical to each other and different sizes, only one preview image that is common to all of these templates.

4. The non-transitory computer readable medium stored with the processing data generation program according to claim 2, wherein
    the preview image displaying device is configured to display, for the templates for the respective pieces of the print data of the images having designs identical to each other and different sizes, only one preview image that is common to all of these templates.

5. A processing data generation system for generating a processing data including a print data and a cut data, the processing data generation system comprising:
- a preview image displaying device, configured to display a preview image of a template for the print data;
- a template designation receiving device, configured to receive designation of a template selected from a group of templates preview images of which are displayed by the preview image displaying device; and
- a processing data generation device, configured to generate the processing data from the template the designation of which has been received by the template designation receiving device, wherein the group includes: the templates for respective pieces of the print data of a plurality of images having designs identical to each other and different sizes, and the processing data generation device is configured to:
- identify the cut data indicating a size of a cut area that matches the size of an image in the print data corresponding to the template the designation of which has been received by the template designation receiving device, and
- generate the processing data including the cut data and the print data created from the print data corresponding to the template the designation of which has been received by the template designation receiving device.

* * * * *